(12) United States Patent
Stocks

(10) Patent No.: US 11,974,206 B2
(45) Date of Patent: Apr. 30, 2024

(54) SHORT-RANGE WIRELESS-ENABLED MOBILE COMMUNICATION DEVICE LEASH FOR CONTROLLING DEVICE AND APPLICATION ACCESS

(71) Applicant: BANK OF AMERICA CORPORATION, Charlotte, NC (US)

(72) Inventor: Dustin Paul Stocks, Stallings, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/725,322

(22) Filed: Apr. 20, 2022

(65) Prior Publication Data
US 2023/0345220 A1    Oct. 26, 2023

(51) Int. Cl.
*H04W 4/80* (2018.01)
*H04B 5/77* (2024.01)
*H04W 4/02* (2018.01)

(52) U.S. Cl.
CPC ............... *H04W 4/80* (2018.02); *H04B 5/77* (2024.01); *H04W 4/023* (2013.01)

(58) Field of Classification Search
CPC ....... H04W 4/80; H04W 4/023; H04B 5/0056
See application file for complete search history.

(56) References Cited

U.S. PATENT DOCUMENTS

| | | |
|---|---|---|
| 8,509,212 B2 | 8/2013 | Sanjeev et al. |
| 8,594,737 B2 | 11/2013 | Walker et al. |
| 9,087,222 B2 | 7/2015 | Lord et al. |
| 9,154,908 B2 | 10/2015 | Lord et al. |
| 9,161,310 B2 | 10/2015 | Lord et al. |
| 9,194,937 B2 | 11/2015 | Lord et al. |
| 9,332,393 B2 | 5/2016 | Lord et al. |
| 9,357,496 B2 | 5/2016 | Lord et al. |
| 9,482,737 B2 | 11/2016 | Lord et al. |
| 9,591,437 B2 | 3/2017 | Lord et al. |
| 9,761,116 B2 | 9/2017 | Dadu et al. |
| 9,794,787 B2 | 10/2017 | Kenney |
| 9,949,080 B2 | 4/2018 | Calvarese et al. |
| 10,003,897 B2 | 6/2018 | Spidsbjerg et al. |
| 10,346,694 B2 | 7/2019 | Irie et al. |
| 10,405,144 B2 * | 9/2019 | Danknick ............. H04W 12/37 |

(Continued)

*Primary Examiner* — David Bilodeau
(74) *Attorney, Agent, or Firm* — Moore & Van Allen PLLC; James C. Edwards

(57) ABSTRACT

A mobile communication device leash is provided which communicates via short-range-wireless communication (e.g., Near-Field Communication (NFC), BLUETOOTH®, ZIGBEE® or the like) with an associated mobile communication device. Once the mobile communication device is outside of the short-range wireless communication range (or outside of a predetermined range within the short-range wireless communication range) an action is triggered to control access to the mobile communication device itself and/or access functionality provided by the mobile communication device. The leash may be a simplistic wireless device, such as a wristband, card device or smart tag device having the sole function of controlling access to the mobile communication device itself (e.g., shutdown or locking the device) and/or access functionality provided by the mobile communication device (e.g., locking certain application or limiting access to data within certain applications).

13 Claims, 3 Drawing Sheets

(56) References Cited

U.S. PATENT DOCUMENTS

| | | | |
|---|---|---|---|
| 10,992,797 B2* | 4/2021 | Klinkner | H04M 1/72457 |
| 2008/0081643 A1 | 4/2008 | Nagata et al. | |
| 2008/0085706 A1 | 4/2008 | Nagata et al. | |
| 2009/0149192 A1 | 6/2009 | Vargas et al. | |
| 2013/0137376 A1* | 5/2013 | Fitzgerald | H04W 8/245 |
| | | | 455/41.3 |
| 2013/0303195 A1 | 11/2013 | Lord et al. | |
| 2014/0082099 A1 | 3/2014 | Burns et al. | |
| 2014/0148196 A1* | 5/2014 | Bassan-Eskenazi | |
| | | | H04W 4/029 |
| | | | 455/456.1 |
| 2015/0074800 A1* | 3/2015 | Farraro | H04W 4/80 |
| | | | 726/20 |
| 2016/0242143 A1* | 8/2016 | Lotter | H04W 12/08 |
| 2017/0231015 A1* | 8/2017 | Jang | G06F 3/0393 |
| 2017/0325141 A1* | 11/2017 | Laliberte | H04W 80/08 |
| 2020/0329345 A1* | 10/2020 | Haines | H04W 4/021 |

* cited by examiner

SHORT-RANGE WIRELESS-ENABLED MOBILE COMMUNICATION DEVICE LEASH FOR CONTROLLING DEVICE AND APPLICATION ACCESS

FIELD OF THE INVENTION

The present invention is related to mobile communication device security and, more specifically, relate to a short-range wireless communication-enabled mobile communication device leash for controlling access to the device and/or applications thereon.

BACKGROUND

In many instances, when a user is separated from their mobile communication device, the user may be unaware that they are no longer in possession of the mobile communication device. Such separation of mobile communication device to user can occur when the user misplaces/loses the device or when, unbeknownst to the user, a nefarious entity wrongfully comes into possession of the mobile communication device. In either instance, once the mobile device is no longer in the possession of the user, the user has a desire to ensure that the personal data stored on or accessible via the mobile communication device is not obtained by someone else. Even in those instances in which the user is immediately aware that the mobile device is no longer in their possession, enough time can lapse between when the user becomes aware of such and when the user is able to deactivate or otherwise shut down the mobile communication device that a wrongful possessor can easily gain access to the personal data stored thereon.

Therefore, a need exists to develop systems, methods and the like for ensuring that a mobile device is either shutdown or locked and/or personal data stored therein is made inaccessible in response to the mobile device being determined to be out of the possession of the user. Specifically, a need exists to shut down, lock or otherwise make personal data inaccessible on mobile communication device, regardless of whether the user is aware that the mobile communication device is out of their possession.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for a mobile communication device leash which communicates via short-range-wireless communication (e.g., Near-Field Communication (NFC), BLUETOOTH®, ZIGBEE® or the like) with an associated mobile communication device. Once the mobile communication device is outside of the short-range wireless communication range (or outside of a predetermined range within the short-range wireless communication range) an action is triggered to control access to the mobile communication device itself and/or access functionality provided by the mobile communication device.

In specific embodiments of the invention, the mobile communication device leash is a simplistic wireless device having the sole function of controlling access to the mobile communication device itself and/or access functionality provided by the mobile communication device. In this regard, the mobile communication device leash may embody a wristband, a card device or a smart tag device, suitable for attachment to a key ring or the like.

Once the mobile communication device is outside of the short-range wireless communication range (i.e., connection lost) or, in other embodiments, outside of a predetermined range inside of the wireless communication range (i.e., connection not lost), the mobile communication device may be configured to control access by powering down the mobile communication device, or locking the mobile communication device (i.e., requiring a user to re-authenticate to access the mobile communication device). In other embodiments of the invention, once the mobile communication device is outside of the short-range wireless communication range (i.e., connection lost) or, in other embodiments, outside of a predetermined range inside of the wireless communication range (i.e., connection not lost), the mobile communication device may be configured to control access to functionality provided by the mobile communication device by limiting access to certain applications stored on or accessible to the mobile communication device or limiting access to functionality within applications accessible on the mobile communication device.

In other specific embodiments of the invention, once the mobile communication device is outside of the short-range wireless communication range (i.e., connection lost) or, in other embodiments, outside of a predetermined range that is still inside of the wireless communication range (i.e., connection not lost), the mobile communication device may be configured to present one or more alternative user interfaces on a display of the user application that display icons for one or more inaccessible mock applications (i.e., a "fake" or "false" UI).

In still further specific embodiments of the invention, once the mobile communication device is outside of the short-range wireless communication range (i.e., connection lost) or, in other embodiments, outside of a predetermined range that is inside of the wireless communication range (i.e., connection not lost), the mobile communication device may be configured to communicate, to a third-party entity, such as public safety/police authority, a service provider or the like, information indicating the geo-physical location of the mobile communication device.

In further embodiments of the invention, the mobile communication device leash may include means to provide a sensory-perceptible signal, (speaker, vibrational mechanism or the like), such that, once the mobile communication device is outside of the short-range wireless communication range (i.e., connection lost) or, in other embodiments, outside of a predetermined range that is still inside of the wireless communication range (i.e., connection not lost), the mobile communication device leash may be configured emit the sensory-perceptible signal as a means of notifying the user that the mobile communication device is no longer in possession of the user.

A system for controlling mobile communication device access and/or functionality defines first embodiments of the invention. The system includes a mobile communication device having a first memory, one or more first computing processor devices in communication with the first memory and a first short-range wireless communication device in communication with at least one of the one or more first computing processor devices. The system additionally includes a leash apparatus having a second memory, a second computing processor device in communication with the second memory and a second short-range wireless communication device in communication with the second computing processor device. The second short-range wireless communication is configured to receive and/or transmit short-range wireless signals transmitted and/received from and/or to the first short-range wireless communication device while the first short-range wireless communication device is within a short-range wireless range of the second short-range wireless communication device.

The system additionally includes a mobile communication device control application that stored in either the first memory or the second memory, and executable by either at least one of the one or more first computing processor devices or the second computing processor device. The application is configured to determine that the first short-range wireless communication device is outside of the short-range wireless communication range for receiving and/or transmitting signals from and/or to the second short-range wireless communication device, and, in response to determining that the first short-range wireless communication device is outside of the short-range wireless range for receiving and/or transmitting signals from and/or to the second short-range wireless communication device, control at least one of (i) access to the mobile communication device, and (ii) access to functionality provided by the mobile communication device.

In specific embodiments of the system, the leash apparatus comprises one of (i) a wristband device, (ii) a card device, or (iii) a smart tag device.

In other specific embodiments of the system, the mobile communication device control application is configured to control access to the mobile communication device by one of (i) powering down the mobile communication device, or (ii) requiring a user to re-authenticate to access the mobile communication device.

In still further specific embodiments of the system, the mobile communication device control application is configured to control access to functionality provided by the mobile communication device by limiting at least one of (i) which of one or more applications accessible on the mobile communication device can be activated, and (ii) access to functionality within at least one of the one or more applications accessible on the mobile communication device.

In additional specific embodiments of the system, the mobile communication device control application is configured to control access to functionality provided by the mobile communication device by presenting one or more alternative user interfaces on a display of the user application, such that, the alternative user interfaces display icons for one or more inaccessible mock applications.

In additional specific embodiments of the system, the mobile communication device control application is further configured to, in response to determining that the first short-range wireless communication device is outside of the short-range wireless range for receiving and/or transmitting signals from and/or to the second short-range wireless communication device, communicate, to a third-party entity, information indicating the geo-physical location of the mobile communication device.

In further specific embodiments of the system, the mobile communication device control application is further configured to provide a sensory-perceptible signal at the leash apparatus that indicates to the user that the short-range wireless reader is outside of the short-range wireless range for receiving signals from the short-range wireless communication transmitter device.

Moreover, in further specific embodiments of the system, the mobile communication device control application is further configured to determine that the first short-range wireless communication device is outside of a predetermined distance that is within the short-range wireless communication range for receiving and/or transmitting signals from and/or to the second short-range wireless communication device, and, in response to such a determination, control at least one of (i) access to the mobile communication device, and (ii) access to functionality provided by the mobile communication device.

In additional specific embodiments of the system, the short-range wireless communication transmitter device and short-range wireless communication reader are configured to communicate via one of (i) Near-Field Communication (NFC), (ii) signals transmitted in a 2.402 to 2.48 Giga Hertz (GHz) range in the ISM frequency bands, and (iii) Institute of Electrical and Electronics Engineers (IEEE) 802.15.4-based specification wireless communication.

A computer-implemented method for controlling mobile communication device access and/or functionality defines second embodiments of the invention. The computer-implemented method is executed by one or more computing processor devices. The method includes determining at least one of (i) a first short-range wireless communication device disposed in a mobile communication device is outside of the short-range wireless communication range for receiving and/or transmitting signals from and/or to a second short-range wireless communication transmitter device disposed in a leash apparatus, and (ii) the first short-range wireless communication device is outside of a predetermined distance that is within the short-range wireless communication range for receiving and/or transmitting signals from and/or to a the second short-range wireless communication. In response to determining at least one of (i) and (ii), the method further includes controlling at least one of (a) access to the mobile communication device, and (b) access to functionality provided by the mobile communication device.

In specific embodiments of the computer-implemented method, the leash apparatus includes one of (i) a wristband device, (ii) a card device, or (iii) a smart tag device.

In other specific embodiments of the computer-implemented method, controlling access to the mobile communication device further comprises one of (i) powering down the mobile communication device, or (ii) requiring a user to re-authenticate to access the mobile communication device.

In still further specific embodiments of the computer-implemented method, controlling access to functionality provided by the mobile communication device further comprises limiting at least one of (i) which of one or more applications accessible on the mobile communication device can be activated, and (ii) access to functionality within at least one of the one or more applications accessible on the mobile communication device.

In additional specific embodiments of the computer-implemented method, controlling access to functionality provided by the mobile communication device further comprises presenting one or more alternative user interfaces on a display of the user application, such that, the alternative user interfaces display icons for one or more inaccessible mock applications.

In additional specific embodiments the computer-implemented method includes, in response to determining that the first short-range wireless communication device is outside of the short-range wireless communication range for receiving and/r transmitting signals from and/or to the second short-range wireless communication device, communicating, to a third-party entity, information indicating the geo-physical location of the mobile communication device.

A computer program product including a non-transitory computer-readable medium defines third embodiments of the invention. The computer-readable medium includes sets of codes. The sets of codes include a set of codes for causing one or more computing processing devices to determine at least one of (i) a first short-range wireless communication device disposed in a mobile communication device is outside of the short-range wireless communication range for receiving and/or transmitting signals from and/or to a second short-range wireless communication transmitter device disposed in a leash apparatus, and (ii) the first short-range wireless communication device is outside of a predetermined distance that is within the short-range wireless communication range for receiving and/or transmitting signals from and/or to a the second short-range wireless communication. Further the sets of codes include a set for causing one or more computing device processors to, in response to determining at least one of (i) and (ii), control at least one of (a) access to the mobile communication device, and (b) access to functionality provided by the mobile communication device.

In specific embodiments of the computer program product, the leash apparatus comprises one of (i) a wristband device, (ii) a card device, or (iii) a smart tag device.

In other specific embodiments of the computer program product, the set of codes for causing the one or more computing processing devices to control access to the mobile communication device are further configured to control access to the mobile communication device by one of (i) powering down the mobile communication device or (ii) requiring a user to re-authenticate to access the mobile communication device.

In still further specific embodiments of the computer program product, the set of codes for causing the one or more computing processing devices to control access to functionality provided by the mobile communication are further configured to control access to functionality provided by the mobile communication by limiting at least one of (i) which of one or more applications accessible on the mobile communication device can be activated, and (ii) access to functionality within at least one of the one or more applications accessible on the mobile communication device.

In additional specific embodiments of the computer program product, the set of codes for causing the one or more computing processing devices to control access to functionality provided by the mobile communication are further configured to control access to functionality provided by the mobile communication by presenting one or more alternative user interfaces on a display of the user application, such that, the alternative user interfaces display icons for one or more inaccessible mock applications.

Thus, according to embodiments of the invention, which will be discussed in greater detail below, the present invention provides for a mobile communication device leash, which communicates via short-range-wireless communication with an associated mobile communication device. Once the mobile communication device is outside of the short-range wireless communication range (or outside of a predetermined range within the short-range wireless communication range) an action is triggered to control access to the mobile communication device itself and/or access functionality provided by the mobile communication device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
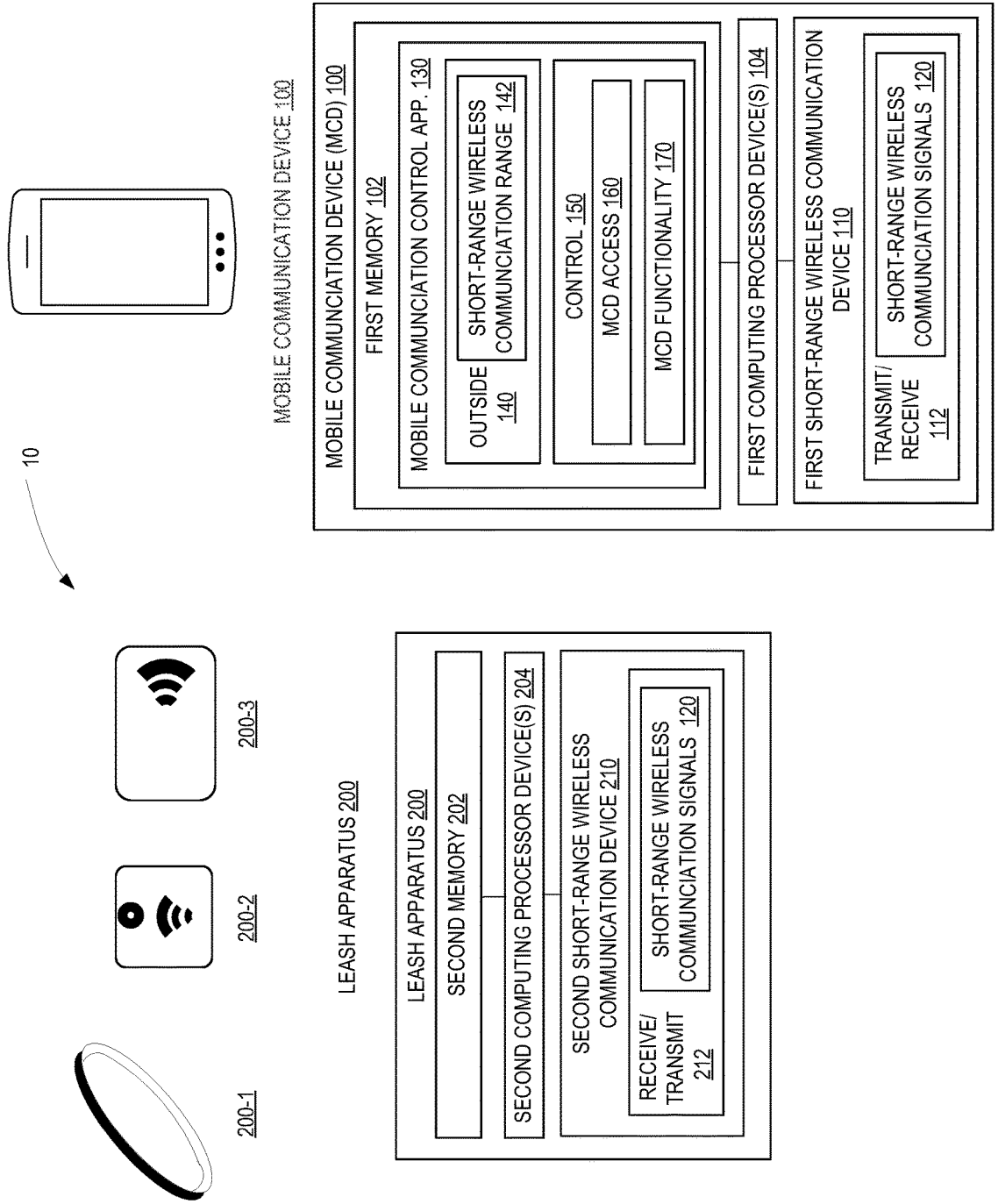
Figure 2:
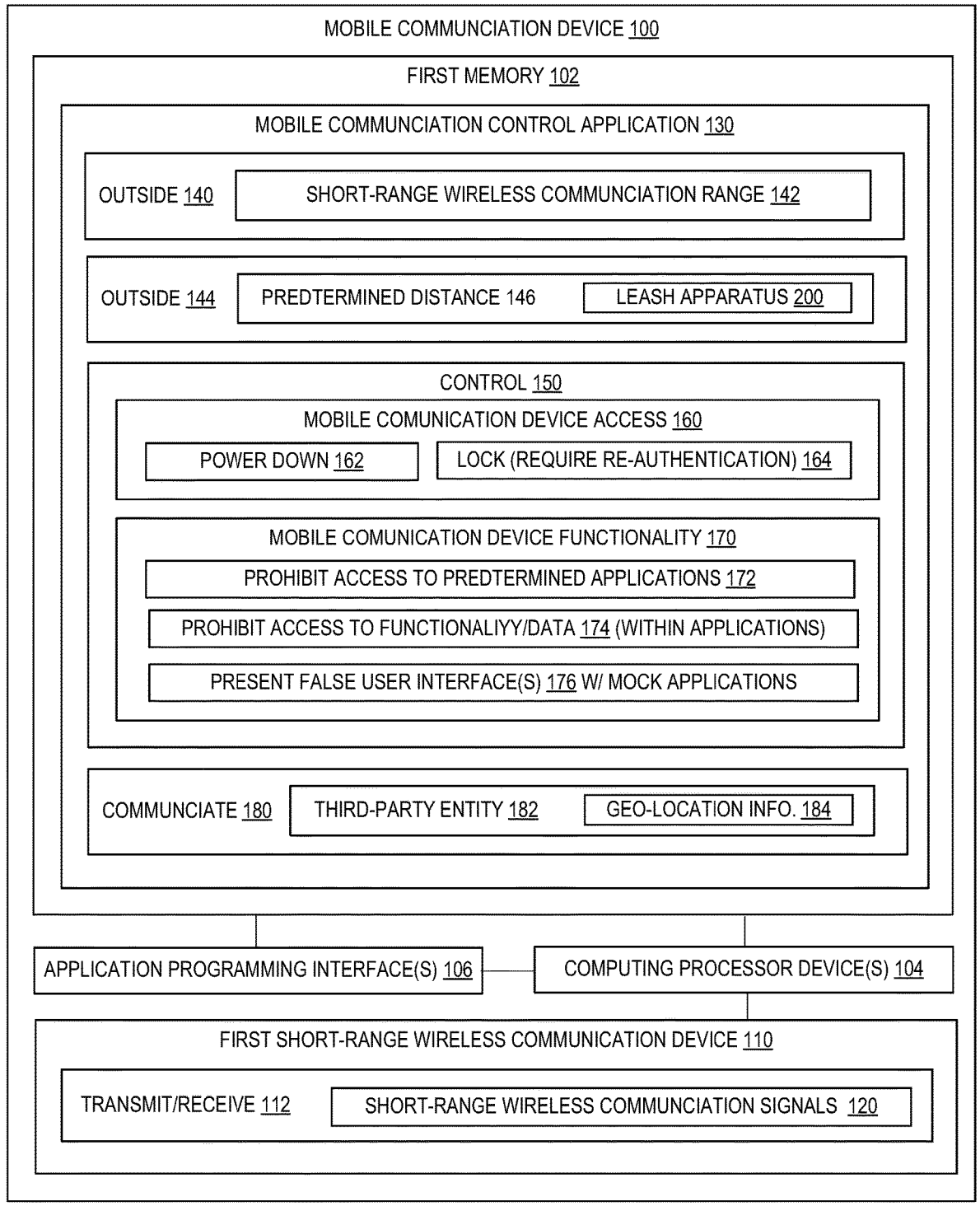
Figure 3:
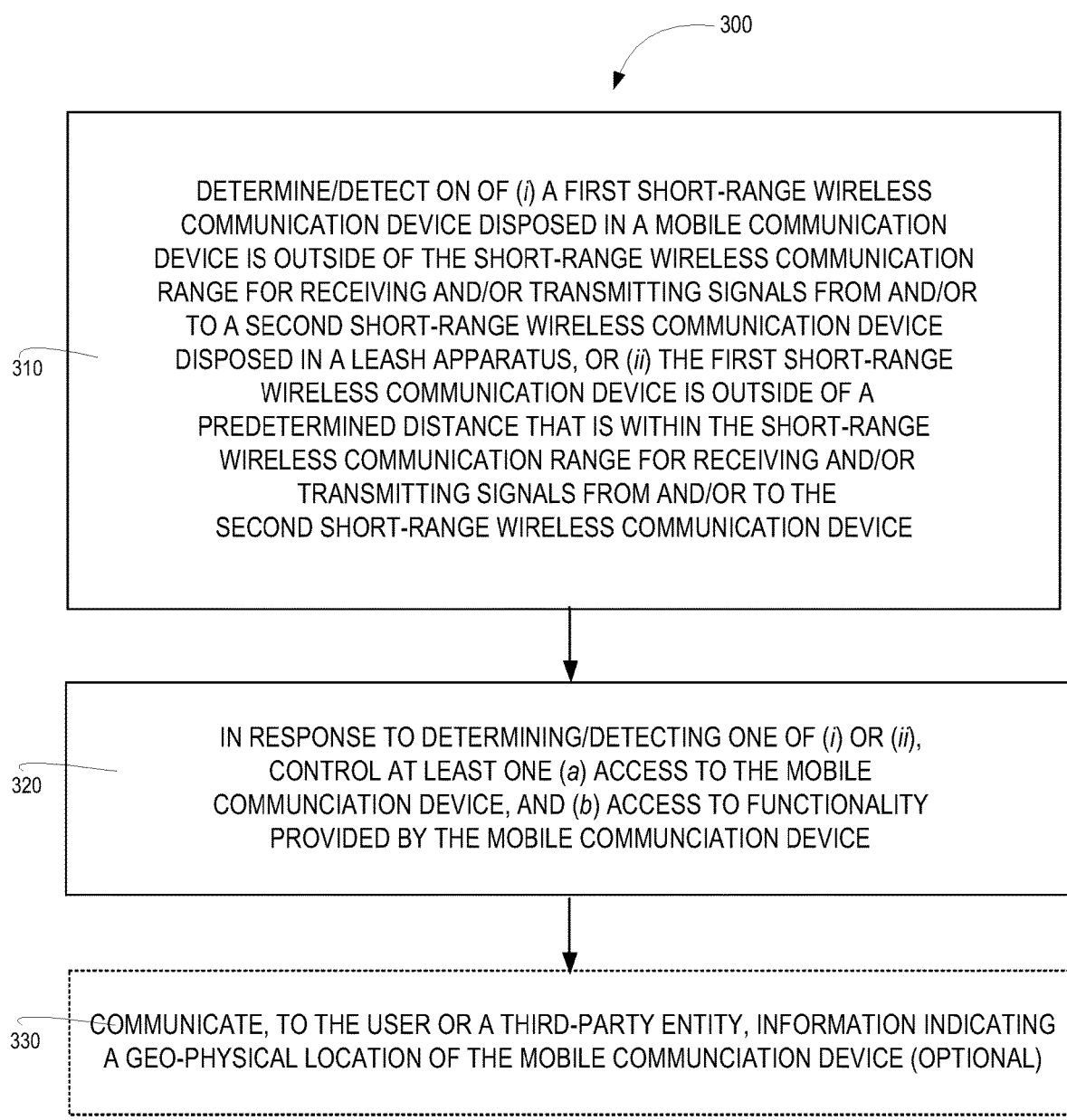

Having thus described embodiments of the disclosure in general terms, reference will now be made to the accompanying drawings, wherein:

FIG. 1 is a schematic/block diagram of a system for controlling access to and/or functionality from a mobile communication device, in accordance with some embodiments of the present disclosure;

FIG. 2 is a block diagram of a mobile communication device configured for access and/or functionality control, in accordance with some embodiments of the present disclosure; and FIG. 3 is a flow diagram of a method for controlling access to and/or functionality from a mobile communication device, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that provide for a mobile communication device leash which communicates via short-range-wireless communication (e.g., Near-Field Communication (NFC), BLUETOOTH®, ZIGBEE® or the like) with an associated mobile communication device. Once the mobile communication device is outside of the short-range wireless communication range (or outside of a predetermined range within the short-range wireless communication range) an action is triggered to control access to the mobile communication device itself and/or access functionality provided by the mobile communication device.

In specific embodiments of the invention, the mobile communication device leash is a simplistic wireless device having the sole function of controlling access to the mobile communication device itself and/or access functionality provided by the mobile communication device. In this regard, the mobile communication device leash may embody a wristband, a card device or a smart tag device, suitable for attachment to a key ring or the like.

Once the mobile communication device is outside of the short-range wireless communication range (i.e., connection lost) or, in other embodiments, outside of a predetermined range inside of the wireless communication range (i.e., connection not lost), the mobile communication device may be configured to control access by powering down the mobile communication device, or locking the mobile communication device (i.e., requiring a user to re-authenticate to access the mobile communication device). In other embodiments of the invention, once the mobile communication device is outside of the short-range wireless communication range (i.e., connection lost) or, in other embodiments, outside of a predetermined range inside of the wireless communication range (i.e., connection not lost), the mobile communication device may be configured to control access to functionality provided by the mobile communication device by limiting access to certain applications stored on or accessible to the mobile communication device or limiting access to functionality within applications accessible on the mobile communication device (i.e., forbidding access to personal data or financial data within specific application or the like).

In other specific embodiments of the invention, once the mobile communication device is outside of the short-range wireless communication range (i.e., connection lost) or, in other embodiments, outside of a predetermined range inside of the wireless communication range (i.e., connection not lost), the mobile communication device may be configured to present one or more alternative User Interfaces (UIs) on a display of the user application that display icons for one or more inaccessible mock applications (i.e., a so-called "fake" or "false" UI).

In still further specific embodiments of the invention, once the mobile communication device is outside of the short-range wireless communication range (i.e., connection lost) or, in other embodiments, outside of a predetermined range inside of the wireless communication range (i.e., connection not lost), the mobile communication device may be configured to communicate, to a third-party entity (e.g., public safety/police authority, a service provider or the like), information indicating the geo-physical location of the mobile communication device.

In further embodiments of the invention, the mobile communication device leash may include a speaker, vibrational mechanism or the like, such that, once the mobile communication device is outside of the short-range wireless communication range (i.e., connection lost) or, in other embodiments, outside of a predetermined range inside of the wireless communication range (i.e., connection not lost), the mobile communication device leash may be configured emit, via the speaker or vibrational mechanism, the sensory-perceptible signal as a means of notifying the user that the mobile communication device is no longer in possession of the user.

Turning now to the figures, FIG. 1 a schematic diagram is provided of a system 100 for controlling access to and/or functionality of a mobile communication device, in accordance with embodiments of the present invention. The system 100 includes a mobile communication device 100, which as shown in FIG. 1 may comprise a smart telephone or any other mobile device figured with short-range wireless communication capabilities, such as wearable devices or the like. Mobile communication device 100 includes a first memory 102 and one or more first computing device processors 104 in communication with the first memory. The mobile communication device 100 includes a first short-range wireless communication device 110 that is in communication with at least one of the first computing processor devices 104 and configured to transmit and/or receive 112 short-range wireless communication signals 120. In this regard, first short-range wireless communication device may comprise a reader, transmitter, reader/transmitter and/or a tag device. In specific embodiments of the system, the short-range wireless communication may comprise Near-Field Communication (NFC), BLUETOOTH® Communication (i.e., communication in the 2.402 GHz to 2.48 GHz range in the ISM frequency bands), ZIGBEE® (i.e., Institute of Electrical and Electronics Engineers (IEEE) 802.15.4-based specification wireless communication) or any other suitable short-range wireless communication mechanism.

System 100 additionally includes leash apparatus 200, which may comprise a wristband 200-1, a smart tag device 200-2, a card device 200-3 or any other device configured with short-range wireless capabilities. Leash apparatus 200 includes second memory 202 and one or more second computing processor devices 204 in communication with second memory 202. Additionally, leash apparatus 200 includes a second short-range computing wireless communication device 210 that is in communication with at least one of the second computing device processor devices 204 and configured to receive and/or transmit 212 the short-range wireless communication signals 120 communicated from or transmitted to the first short-range wireless communication device 110 of the mobile communication device 100, while the first short-range wireless communication device 110 is within a short-range wireless communication range of the second short-range wireless communication device 210. As such, first and second short-range wireless communication devices are configured to transmit/receive the same type of short-range wireless communication signals. In specific embodiments of the invention, leash apparatus 200 is a simplified, low-cost device configured for the sole purpose of controlling access to and/or functionality of the mobile communication device 100.

First memory 102 of mobile communication device 130 (or in some embodiments of the system, not shown in FIG. 1, second memory of leash apparatus 200) stores mobile communication control application 130 that is configured to detect when the first short-range wireless communication device 110 is outside 140 of the range short-range wireless communication range 142 for receiving and/or transmitting signals from and/or to the second short-range wireless communication device 210. In response to detecting the first short-range wireless communication device 110 is outside 140 of the range short-range wireless communication range 142 for receiving and/or transmitting signals from and/or to the second short-range wireless communication device 210, mobile communication control application 130 is configured to control at least one of (i) access to the mobile communication device 100 and (ii) access to functionality provided by the mobile communication device. Specific embodiments/examples of controlling (i) access to the mobile communication device 100 and (ii) access to functionality provided by the mobile communication device will be described in relation to FIG. 2, infra.

Referring to FIG. 2, a block diagram is presented of mobile communication device 100 configured for controlling access and/or functionality, in accordance with embodiments of the present invention. In addition to providing greater details of the mobile communication device 100, FIG. 2 highlights various alternate embodiments of the invention. mobile communication device 100 includes first memory 102, which may comprise volatile and non-volatile memory, such as read-only and/or random-access memory (RAM and ROM), EPROM, EEPROM, flash cards, or any memory common to computing platforms). Moreover, second memory 102 may comprise cloud storage, such as provided by a cloud storage service and/or a cloud connection service.

Further, mobile communication device 100 also includes one or more first computing processor devices 104, which may be an application-specific integrated circuit ("ASIC"), or other chipset, logic circuit, or other data processing device. First computing processor device(s) 104 may execute one or more application programming interface (APIs) 106 that interface with any resident programs, such as mobile communication device control application 130 or the like, stored in first memory 102 of mobile communication device 100 and any external programs. First computing processor devices(s) 104 may include various processing subsystems (not shown in FIG. 2) embodied in hardware, firmware, software, and combinations thereof, that enable the functionality of mobile communication device 100 and the operability of mobile communication device 100 on a network, such as the Intranet, cellular network(s) and the like. For example, processing subsystems allow for initiating and maintaining communications and exchanging data with other networked devices. For the disclosed aspects, processing subsystems of mobile communication device 100 may include any subsystem used in conjunction with mobile communication device control application 130 and related tools, routines, sub-routines, algorithms, sub-algorithms, sub-modules thereof.

Additionally, mobile communication device 100 includes first short-range wireless communication device 110 that is configured to transmit and/or receive 112 short-range wireless communication signals 120. As previously discussed in relation to FIG. 1, first short-range wireless communication device 110 may comprise a transmitter, reader, transmitter/reader, tag or the like and the short-range wireless communication type may comprise NFC, BLUETOOTH®, ZIGBEE® or any other suitable short-range wireless communication type.

Mobile communication device 100 may additionally include a communications module (not shown in FIG. 2) embodied in hardware, firmware, software, and combinations thereof, that enables electronic communications between the mobile communication device 100 and other networks and network devices. Thus, communication module may include the requisite hardware, firmware, software and/or combinations thereof for establishing and maintaining a network communication connection with one or more devices and/or networks.

First memory 102 of mobile communication device 100 stores mobile communication device control application 130 that is executable by at least one of first computing processor device(s) 104. Mobile communication device control application 130 is configured to detect when the first short-range wireless communication device is outside 140 of the short-range wireless communication range 142 for receiving and/or transmitting short-range communication signals 120 from and/or to the second short-range wireless communication device 210 of the leash apparatus 200 (shown in FIG. 1).

In response to detecting the first short-range wireless communication device 110 is outside 140 of the range short-range wireless communication range 142 for receiving and/or transmitting signals from and/or to the second short-range wireless communication device 210, mobile communication control application 130 is configured to control at least one of (i) access mobile communication device access 160 and (ii) mobile communication functionality 170. Thus, if the user misplaces/loses the mobile communication device 100 or someone misappropriates the mobile communication device 100 actions are automatically taken to prohibit access to the mobile communication device 100 or limit access to specific functionality provided by the mobile communication device 100.

In specific embodiments of the invention, controlling mobile communication device access 160 includes at least one of powering down 162 (i.e., shutting off) the mobile communication device and locking 164 (i.e., requiring the user to re-authenticate to access the device). In other specific embodiments of the invention, controlling mobile communication device functionality 170 includes prohibiting access to predetermined applications 172, such as financial institution applications or any other applications that store or provide access to personal information including personal financial information. In specific embodiments of the invention, the mobile communication device control application 130 defines the predetermined applications 172, while in other embodiments of the invention, the predetermined applications are selected by the user. In other specific embodiments of the invention, controlling mobile communication device functionality 170 includes prohibiting access to functionality/data 174 within specific applications 172, such as prohibiting access to certain features (e.g., financial transactions) or data (e.g., account balances) within a mobile banking application or the like. In specific embodiments of the invention, the mobile communication device control application 130 defines the features/data 174 and the specific applications, while in other embodiments of the invention, the features data/174 and/or specific applications are selected by the user.

In other specific embodiments of the invention, controlling mobile communication device functionality 170 includes presenting one or more false (i.e., "fake") user interfaces (UIs) 176 on the home screen of the mobile communication device's display. The false UIs display icons for mock applications (i.e., applications that appear to be real but are otherwise inaccessible to the user). The presentation of fake UIs may be advantageous in cases in which the mobile communication device has be misappropriated and the user desires to give the misappropriating entity the illusion, on first glance, that they have procured a functional mobile communication device.

In further response to detecting the first short-range wireless communication device 110 is outside 140 of the range short-range wireless communication range 142 for receiving and/or transmitting signals from and/or to the second short-range wireless communication device 210, mobile communication control application 130 is further configured to communicate 180 mobile communication device geo-location information 184 to the user (e.g., user's email address) or a third-party entity (e.g., law enforcement or another entity responsible with assisting in device recovery) to assist in the recovery of a misplaced/lost or misappropriated mobile communication device 100.

In further embodiments of the mobile communication device control application 130 is configured to detect when the first short-range wireless communication device is outside 144 of a predetermined distance 146 that is within the short-range wireless communication range 142 for receiving and/or transmitting short-range communication signals 120 from and/or to the second short-range wireless communication device 210 of the leash apparatus 200 (shown in FIG. 2). In response to detecting that the first short-range wireless communication device is outside 144 of a predetermined distance 146 that is within the short-range wireless communication range 142 for receiving and/or transmitting short-range communication signals 120 from and/or to the second short-range wireless communication device 210, mobile communication control application 130 is configured to control at least one of (i) access mobile communication device access 160 and (ii) mobile communication functionality 170. In this regard, in certain embodiments of the invention, the mobile communication device control application 130 may be configured to perform a first control action (e.g., limit access to certain applications) when the first short-range wireless communication device is outside 144 of a predetermined distance 146 that is within the short-range wireless communication range 142 for receiving and/or transmitting short-range communication signals and perform a second control action (e.g., power down or lock the device) when the first short-range wireless communication device is outside 140 of the short-range wireless communication range 142 for receiving and/or transmitting short-range communication signals 120 from and/or to the second short-range wireless communication device 210.

Referring to FIG. 3, a flow diagram is presented of a method 300 for controlling access to and/or functionality from a mobile communication device, in accordance with embodiments of the present invention. At Event 310, a determination/detection is made that either (i) a first short range wireless communication device of a mobile communication is outside of the range for short-range wireless communication for receiving and/or transmitting communication from/to a second short-range wireless communication device of a leash apparatus, or (ii) the first short-range wireless communication device is outside of a predetermined distance that is within the range for short-range wireless communication for receiving and/or transmitting communication from/to the second short-range wireless communication device.

In response to determining/detecting either (i) or (ii), at Event 320, access to at least one of (i) the mobile communication device, or (ii) functionality provided by the mobile communication is controlled. Control of access to the mobile communication device may include powering down the device or locking the device (i.e., requiring the user to re-authenticate to access the device). Control of functionality provided by the mobile communication device may include prohibiting use of/locking predetermined applications on the mobile communication device, prohibiting predetermined functions and access to predetermined data within predetermined applications or presenting a false UI/home page that displays mock applications or the like.

In response to determining/detecting either (i) or (ii) or controlling access to or functionality provided by the mobile communication device, at Optional Event 330, information indicating the geo-location of the mobile communication device is communicated either to the user or to a third-party entity for purposes of aiding in the recovery of a mobile communication that is out of possession of the user (i.e., either misplaced/lost or misappropriated by a nefarious entity).

Thus, present embodiments of the invention. discussed in detail above, provide for a mobile communication device leash, which communicates via short-range-wireless communication (e.g., Near-Field Communication (NFC), BLUETOOTH®, ZIGBEE® or the like) with an associated mobile communication device. Once the mobile communication device is outside of the short-range wireless communication range (or outside of a predetermined range within the short-range wireless communication range) an action is triggered to control access to the mobile communication device itself and/or access functionality provided by the mobile communication device.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein

What is claimed is:

1. A system for controlling mobile communication device access and/or functionality, the system comprising:
   a mobile communication device including a first memory, one or more first computing processor devices in communication with the first memory and a first short-range wireless communication device in communication with at least one of the one or more first computing processor devices;
   a leash apparatus including a second memory, a second computing processor device in communication with the second memory and a second short-range wireless communication device in communication with the second computing processor device and configured to receive and/or transmit short-range wireless communicated signals transmitted from and/or to the first short-range wireless communication device while the first short-range wireless communication device is within a short-range wireless communication range of the second short-range wireless communication device; and
   a mobile communication device control application stored in at least one of the first memory and the second memory, executable by at least one of the one or more first computing processor devices and the second computing processor device and configured to:
      determine that the mobile communication device is outside of a predetermined distance from and/or to the leash apparatus, the predetermined distance being within the short-range wireless communication range for the first short-range wireless communication device to receive and/or transmit signals from and/or to the second short-range wireless communication device,
      in response to determining that the mobile communication device is outside of the predetermined distance, perform a first control action, wherein the first control action comprises at least one of (i) prohibiting access to one or more first applications stored on the mobile communication device and (ii) prohibiting access to functionality within one or more second applications stored on the mobile communication device,
      determine that the first short-range wireless communication device is outside of the short-range wireless communication range for receiving and/or transmitting signals from and/or to the second short-range wireless communication device, and
      in response to determining that the first short-range wireless communication device is outside of the short-range wireless communication range for receiving and/or transmitting signals from and/or to the second short-range wireless communication device, perform a second control action, wherein the second control action comprises at least one of (i) powering down the mobile communication device or (ii) requiring a user to re-authenticate to access the mobile communication device.

2. The system of claim 1, wherein the leash apparatus comprises one of (i) a wristband device, (ii) a card device, or (iii) a smart tag device.

3. The system of claim 1, wherein the second control action further comprises presenting one or more alternative user interfaces on a display of the user application, wherein the alternative user interfaces display icons for one or more inaccessible mock applications.

4. The system of claim 1, wherein the mobile communication device control application is further configured to in response to determining that the first short-range wireless communication device is outside of the short-range wireless communication range for receiving and/or transmitting signals from and/or to the second short-range wireless communication device, communicate, to a third-party entity, information indicating a geo-physical location of the mobile communication device.

5. The system of claim 1, wherein the mobile communication device control application is further configured to provide a sensory-perceptible signal at the leash apparatus that indicates to the user that the first short-range wireless communication device is outside of the short-range wireless communication range for receiving and/or transmitting signals from and/or to the second short-range wireless communication device.

6. The system of claim 1, wherein the first and second short-range wireless communications are configured to communicate via one of (i) Near-Field Communication (NFC), (ii) signals transmitted in a 2.402 to 2.48 Giga Hertz (GHz) range in the ISM frequency bands, and (iii) Institute of Electrical and Electronics Engineers (IEEE) 802.15.4-based specification wireless communication.

7. A computer-implemented method for controlling mobile communication device access and/or functionality, the computer-implemented method is executed by one or more computing processor devices and comprises:
   determining that a mobile communication device disposed in a mobile communication device is outside of a predetermined distance of a leash apparatus that is in possession of a user, wherein the predetermined distance within a short-range wireless communication range for a first short-range wireless communication device disposed in the mobile communication device to receive and/or signals from and/or to a second short-range wireless communication device disposed in the leash apparatus;
   in response to determining that the mobile communication device is outside of the predetermined distance from the leash apparatus, performing a first control action, wherein the first control action comprises at least one of (i) prohibiting access to one or more first applications stored on the mobile communication device and (ii) prohibiting access to functionality within one or more second applications stored on the mobile communication device;
   determining that the first short-range wireless communication device is outside of the short-range wireless communication range for receiving and/or transmitting signals from and/or to the second short-range wireless communication device; and
   in response to determining that the first short-range wireless communication device is outside of the short-range wireless communication range for receiving and/or transmitting signals from and/or to the second short-range wireless communication device, performing a second control action, wherein the second control action comprises at least one of (i) powering down the mobile communication device or (ii) requiring a user to re-authenticate to access the mobile communication device.

8. The computer-implemented method of claim 7, wherein the leash apparatus comprises one of (i) a wristband device, (ii) a card device, or (iii) a smart tag device.

9. The computer-implemented method of claim 7, wherein the second control action further comprises presenting one or more alternative user interfaces on a display of the user application, wherein the alternative user interfaces display icons for one or more inaccessible mock applications.

10. The computer-implemented method of claim 7, further comprising in response to determining that the first short-range wireless communication device is outside of the short-range wireless communication range for receiving and/or transmitting signals from and/or to the second short-range wireless communication device, communicating, to a third-party entity, information indicating a geo-physical location of the mobile communication device.

11. A computer program product comprising:
a non-transitory computer-readable medium comprising sets of codes for causing one or more computing processing devices to:
determine that a mobile communication device disposed in a mobile communication device is outside of a predetermined distance of a leash apparatus that is in possession of a user, wherein the predetermined distance is within a short-range wireless communication range for a first short-range wireless communication device disposed in the mobile communication device to receive and/or signals from and/or to a second short-range wireless communication device disposed in the leash apparatus;
in response to determining that the mobile communication device is outside of the predetermined distance from the leash apparatus, perform a first control action, wherein the first control action comprises at least one of (i) prohibiting access to one or more first applications stored on the mobile communication device and (ii) prohibiting access to functionality within one or more second applications stored on the mobile communication device;
determine that the first short-range wireless communication device is outside of the short-range wireless communication range for receiving and/or transmitting signals from and/or to the second short-range wireless communication device; and
in response to determining that the first short-range wireless communication device is outside of the short-range wireless communication range for receiving and/or transmitting signals from and/or to the second short-range wireless communication device, perform a second control action, wherein the second control action comprises at least one of (i) powering down the mobile communication device or (ii) requiring a user to re-authenticate to access the mobile communication device.

12. The computer program product of claim 11, wherein the leash apparatus comprises one of (i) a wristband device, (ii) a card device, or (iii) a smart tag device.

13. The computer program product of claim 11, wherein the set of codes for causing the one or more computing processing devices to perform the second control action are further configured to perform the second control action comprising presenting one or more alternative user interfaces on a display of the user application, wherein the alternative user interfaces display icons for one or more inaccessible mock applications.

* * * * *